Feb. 6, 1940.  B. RONAY  2,188,925

WELDING JOINT AND CHILL RING THEREFOR

Filed Feb. 24, 1939

INVENTOR
BELA RONAY
BY
*Ransom K. Davis*
ATTORNEY

Patented Feb. 6, 1940

2,188,925

UNITED STATES PATENT OFFICE 2,188,925

WELDING JOINT AND CHILL RING THEREFOR

Bela Ronay, Annapolis, Md.

Application February 24, 1939, Serial No. 258,266

5 Claims. (Cl. 113—112)

(Granted under the act of March 3, 1883, as amended April 30, 1928; 370 O. G. 757)

This invention relates to a welding joint and a chill ring used in making such welded joint, and has for an object to provide an improved chill ring usable in the preparation of such welding joint.

A further object of this invention is to provide an improved welded joint having the roots of the joint properly fused together and having a substantially smooth interior surface which will not obstruct the flow of a fluid therethrough.

A further object of this invention is to provide a chill ring for use in making such welded joint, which chill ring is of such a material that it will partly volatilize as the welding is carried on, leaving a skeleton which is as porous as a sponge and brittle so that it will easily shatter and may be blown or washed out.

A further object of this invention is to provide a chill ring for use in welding joint, which chill ring is made in the form of two separate portions, one portion being inserted at each end of the pipe forming part of the joint and which chill ring will fay with the end of the pipe so that no "icicles" will form on the interior of the joint.

A further object of this invention is to provide a chill ring which is slightly tapered or frusto-conical in outline so as to insure proper faying in a pipe which is within the limit of tolerance allowed for the particular size involved.

With the foregoing and other objects in view, the invention consists in the construction, combination and arrangement of parts hereinafter described and illustrated in the drawing, in which, Fig. 1 is a sectional view axially of a welded joint utilizing the chill ring of this invention.

Figure 2:
Fig. 2 is a sectional view of a chill ring unit per se.
Figure 3:
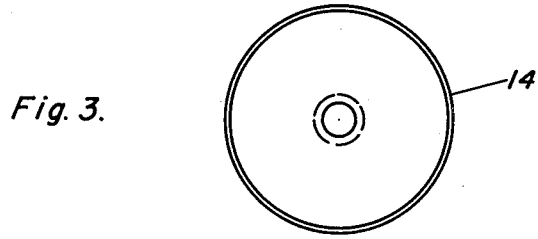
Fig. 3 is a bottom plan view of the chill ring unit of Fig. 2.

There is shown at 10 the lower end of an upper pipe which is secured to the upper end of a lower pipe 11 by means of a weld 12 made according to this invention. One unit 14 of the chill ring utilized in making the weld 12 is shown in Figs. 2 and 3. This chill ring unit 14 is made of a mixture of 45% alumina, or any other suitable refractory, 45% confectioner's sugar, and 10% graphite. All of these ingredients are in powdered form and mixed thoroughly before being introduced into dies which shape the chill ring units without the use of any additional binding material. The proportions given may be varied within reasonable limits to increase or decrease the refractoriness, as may be desired.

The combustible portions of the ring units may be other substances besides those mentioned, such as wood flour, grain flour, or any other carbonaceous material in the finely divided form. The role of the combustible material in the matrix of the rings is to volatilize in course of welding and thus leave the refractory residue as porous as a sponge. Without any binder the porous refractory residue is brittle and disintegrates under the slight blows given the weld metal in removing slag subsequent to the deposition of each pass or layer of weld metal into the groove of the joint. Subsequently, this residue may be blown out in solid chunks by air or washed out as a thin sludge with water.

The chill ring units 14 are each slightly tapered. When used in a pipe of 1½ to 2 inches diameter the chill ring units will be each ⅜ of an inch thick and .006 of an inch difference in diameter between the upper and the lower faces thereof, thereby providing chill ring units which are tapered frusto-conical in shape.

In operation, a chill ring unit 14 will be placed in the ends of each pipe to be joined, the taper in the sides of the unit being just sufficient to insure proper faying of the chill ring with the inside of the pipe ends so long as such pipe ends are within the limits of tolerance for the sizes involved.

Associated with the use of the rings is the design pertaining to the preparation of the tube ends. In order to obtain full penetration without requiring unusual welding technique, the design given forthwith must be adhered to in order to develop the full advantage of the use of the subject chill rings.

Since the prime requisite is to obtain full penetration, it is necessary to remelt a quantity of base metal at the root of the weld. If the joint design is a U or a wide-bottom V, then the thickness of the squarely butted root face is the governing factor whether or not the average welder may uniformly remelt it to its full depth. If the depth of the root faces in joints of the above-mentioned conventional design is limited to $\frac{1}{16}''$, any welder of ordinary skill is able to remelt the root right from the start. However, as he proceeds the crater enlarges to an extent that it cannot be refilled in the normal rate of progression, but requires special technique and even then it is bound to produce a slag pocket at the base of the so enlarged crater. On the other hand, if the root face is left heavier than a $\frac{1}{16}''$, for instance, $\frac{3}{32}''$, then the melting through from the start even for welders more skilled than the average operator, becomes a difficult task, especially in position work.

Figure 1:
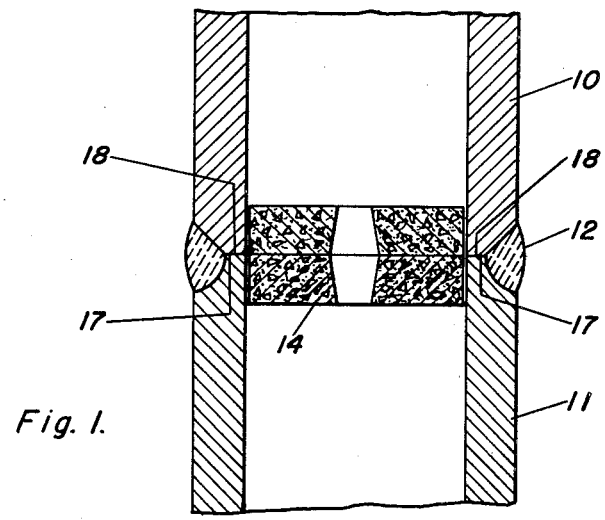

In case of such design, the filling in of the unavoidable craters becomes an even more serious obstacle. In order to permit the remelting of the root without the ensuing complication of enlarged craters, the design shown on the drawing in Fig. 1 was evolved which enables the fulfillment of the above requirements. It consists of preparing one tube end of each joint as one-half of a conventional U joint having a 1/16" root face as at 17. The other tube end of the joint is prepared with 30° kerf terminating in a 1/16" root face as at 18. In depositing the first pass in the joint formed by abutting the above-mentioned tube ends, the electrode, or the impingement of the flame of a welding torch, is directed against the heavier member. This permits the maintenance of a constant crater size, as when a welder notes that the crater size is somewhat larger than the diameter of the electrode he is using, he shifts his electrode further up on the sloping kerf of the 30° wall and thus, having increased the volume heated, he is able to control constantly and instantaneously the crater size and as a final result, to produce all joints having fully fused roots and smooth interiors.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A hollow chill ring comprising a chill ring unit in the form of a truncated cone, said chill ring unit being insertable completely into the end of the pipe being joined, said chill ring unit being non-metallic, said non-metallic chill ring unit consisting of approximately 45% alumina, 45% confectioner's sugar, and 10% graphite.

2. A hollow chill ring comprising a chill ring unit in the form of a truncated cone, said chill ring unit being insertable completely into the end of the pipe being joined, said chill ring unit being non-metallic, said chill ring unit consisting of a refractory and a volatizable material, said volatizable material comprising between 50 and 60%.

3. A hollow non-metallic chill ring comprising a pair of chill ring units, said units being adapted to be placed in the ends of the pipes being joined, said units being composed of a refractory comprising over 40% and less than 60% and a volatizable material adapted to volatize during the welding and leave the refractory in a porous, brittle condition adapted to disintegrate under slight shock.

4. A non-metallic chill ring unit consisting of approximately 45% alumina, 45% confectioner's sugar and 10% graphite.

5. In the method of preparing two pipe ends for welding into a single joint, the insertion of a frusto-conical chill ring section into each pipe end with its smaller diameter interior of the pipe end and its greater diameter flush with the pipe end, the smaller and greater diameters of the chill ring portion encompassing the limits of tolerance of the pipe diameter, the material of the chill ring section being semi-plastic to insure perfect faying of the chill ring section to the pipe end, and then placing the two pipe ends into abutting relation with the flush ends of the chill ring sections abutting to form a properly fayed complete chill ring.

BELA RONAY.